United States Patent [19]

Taormina

[11] Patent Number: 4,457,462

[45] Date of Patent: Jul. 3, 1984

[54] TOOL HOLDER

[76] Inventor: Umberto C. Taormina, 10 Pinewood Ave., West Long Branch, N.J. 07764

[21] Appl. No.: 296,551

[22] Filed: Aug. 26, 1981

[51] Int. Cl.$^3$ .............................................. G01C 15/10

[52] U.S. Cl. .................................... 224/269; 224/252; 224/904; D2/400

[58] Field of Search ............... 224/269, 200, 225, 226, 224/232, 234, 251, 252, 268, 904, 914, 919, 269, 248; D2/400

[56] References Cited

U.S. PATENT DOCUMENTS

| | | | |
|---|---|---|---|
| D. 261,197 | 10/1981 | Rowswell | 224/904 X |
| 1,326,887 | 12/1919 | Wood | 224/904 X |
| 2,803,387 | 8/1957 | Pearce | 224/269 X |
| 3,104,434 | 9/1963 | Noordhoek | 224/252 X |
| 3,768,709 | 10/1973 | Kinard | 224/248 |
| 4,321,755 | 3/1982 | Ilgen | 224/269 X |

*Primary Examiner*—Steven M. Pollard
*Attorney, Agent, or Firm*—Weinstein & Sutton

[57] ABSTRACT

A tool holder for supporting a tool and the tool holder for being supported by the belt of a worker, the tool holder is formed from a length of material, such as a length of galvanized, mild steel, with the end portions of the material formed into a configuration, such as a generally inverted U-shaped configuration, for permitting the tool holder to be attached to the belt of the worker, and with the intermediate portion of the material formed into a configuration, such as a generally circular or convoluted configuration, for receiving the tool whereby the tool is supported by the tool holder.

6 Claims, 4 Drawing Figures

FIG. 1a FIG. 1b FIG. 1c
PRIOR ART
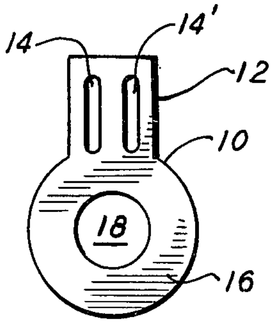
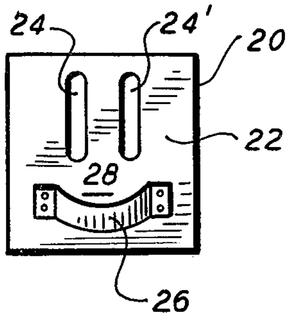
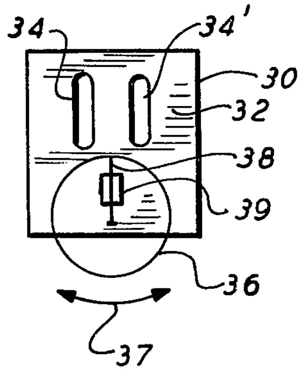
FIG. 2
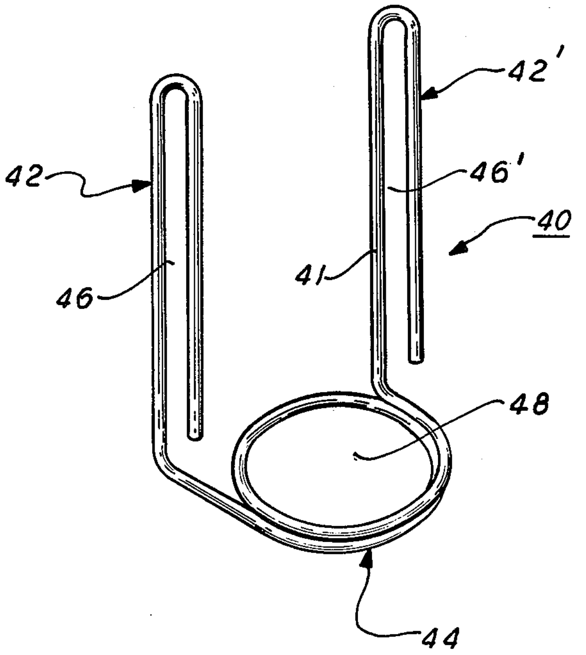

TOOL HOLDER

BACKGROUND OF THE INVENTION

As known to those skilled in the tool holder art, there is an ever present need among workers, such as masons, carpenters, electricians, and the like, for a tool holder which may be easily, removably attached to the belt of the worker and which tool holder may be used to support many different kinds of tools, such as for example a mason's trowel, a screwdriver, a hammer, a flashlight, and the like.

As is further known to those skilled in the tool holder art, and in particular those skilled in the manufacture, sale and marketing of such tool holders, it is highly desirable to provide a tool holder which is inexpensive to manufacture, has a relatively low sales price and yet provides a reasonable margin of profit, and which is durable under working conditions, and which has a reasonably long life.

While the tool holder art is replete with many different kinds of tool holders, the prior art tool holders generally fall into two categories, namely, leather tool holders and tool holders formed of a combination of leather and metal. The leather in such tool holders does not hold its shape well, and, being a natural material, the leather is relatively perishable. Those tool holders which are a combination of leather and metal are relatively expensive to manufacture due to the assembly cost incurred in affixing the metal to the leather, and further, tool holders formed of a combination of metal and leather present inventory problems to the manufacturer in that both an inventory of leather and metal must be maintained and their quantities coordinated to be certain that sufficient of each is on hand for the required production.

Accordingly, there exists a need in the tool holder art for a tool holder which is inexpensive to manufacture, simple to use and durable in performance. It is an object of this invention to provide such a tool holder and to overcome the above-noted prior art problems attendant to the typical prior art tool holder.

SUMMARY OF THE INVENTION

The gist of the tool holder of the present invention is that it is formed from a length of a single material, such as a length of galvanized mild steel, wherein the end portions of the material are formed into a configuration for permitting the tool holder to be removably attached to the belt of the worker, and wherein the intermediate portion of the material is formed into a configuration providing an aperture for removably receiving the tool whereby the tool is supported by the tool holder.

DESCRIPTION OF THE DRAWINGS

FIGS. 1*a*, 1*b* and 1*c* illustrate typical prior art tool holders; and

FIG. 2 is an illustration of a tool holder embodying the present invention.

DESCRIPTION OF THE PREFERRED EMBODIMENT

Referring now to FIGS. 1*a*, 1*b* and 1*c*, and in particular to FIG. 1*a*, there is shown a typical prior art tool holder 10, made from leather, including a belt attaching portion 12 provided with a pair of adjacent apertures 14 and 14', through which the worker's belt may be threaded, and further including a tool supporting portion 16 provided with a central, circular aperture 18, for receiving a tool, or a portion of a tool, such as the shank of a screwdriver or the handle of a mason's trowel, whereby the tool is supported by the tool holder 10.

In FIG. 1*b*, there is shown another prior art tool holder 20 formed from two different materials such as leather and metal. The rectangular belt attaching portion 22 is formed from leather and is provided with a pair of adjacent apertures 24 and 24' through which the worker's belt may be threaded, and the semi-circular or crescent shaped tool supporting portion 26 is formed from a suitable metal having its ends suitably stapled or riveted to the leather portion 22 whereby an integral tool holder is formed. The semi-circular metal portion 26 extends outwardly from the plane of the belt attaching portion 22 and provides, in the vertical, a generally semi-circular or crescent shaped aperture 28 for receiving a portion of a tool, such as the above-noted shank of a screwdriver or the handle of a mason's trowel, whereby the tool is supported by the tool holder 20.

The third typical prior art tool holder, tool holder 30 shown in FIG. 1*c*, is also formed from two different materials such as leather and metal. This tool holder also includes a rectangular belt attaching portion 32 formed from leather which is also provided with a pair of adjacent apertures 34 and 34', through which the belt of the worker may be threaded, and further includes a metal tool supporting portion 36 provided with an integrally formed journal member 38 rotatably or pivotally mounted in a bearing member 39 such as a semi-circular band of metal suitably secured to the leather portion 32 such as by rivets. The unique feature of this prior art tool holder 30 is that the metal tool supporting portion 36 swivels from side to side as indicated by the dual-headed arrow 37, with the journal member 38 pivoting or rotating in the bearing member 39, thereby facilitating the receipt and support of a tool by the tool holder 30.

As noted above, these typical prior art tool holders, namely tool holders 10, 20 and 30, have the prior art problems also noted above with regard to cost of manufacture and cost and inconvenience of material inventory.

Referring now to FIG. 2, there is shown an improved tool holder indicated by general numerical designation 40 which embodies the present invention. The tool holder 40 is formed from a length of material 41, such as for example a continuous length of a galvanized mild steel or a chrome plated steel wire, of No. 9 gauge, and which length of material includes end portions designated by general numerical designations 42 and 42' and an intermediate portion designated by general numerical designation 44.

Each of the end portions 42—42' is formed into a generally inverted U-shaped configuration as shown to provide a pair of spaced apart, aligned and generally rectangular interstices or apertures 46 and 46'. In use, these interstices or apertures 46 and 46' are for being oriented generally horizontally and for receiving the belt of a worker whereby the tool holder 40 is supported by the belt of the worker.

The intermediate portion 44 is formed to extend substantially perpendicular to the end portions 42 and 42' and is further formed into a generally convoluted configuration as shown to provide a generally circular aperture 48 lying in a plane substantially perpendicular to the respective planes in which the rectangular apertures 46 and 46' lie. The generally circular aperture 48 is for being oriented generally vertically upon the tool holder 40 being attached to a worker's belt as described above, and the aperture 48 is for removably receiving a portion of a tool, such as for example the shank of a screwdriver, the handle of a mason's trowel, whereby the tool is removably supported by the tool holder 40.

Referring again to FIG. 2, and the above detailed description of the preferred embodiment of the present invention illustrated herein, it will be further understood by those skilled in the art that the continuous length of material 41 may have a length in the range of from 10 to 36 inches depending upon the size of the circular aperture 48 desired; the circular aperture 48 may have a diameter in the range of from ½ inch to 2½ inches depending on the size of the tool to be supported; and the length of material 41 may have a thickness, e.g. diameter upon the continuous length of material 41 being circular metal wire, of from ⅛ inch to ¼ inch.

It will be understood by those skilled in the tool holder art that tool holder 40 is inexpensive to manufacture, will bear a relatively low sales price while providing a reasonable margin of profit, will be durable in use and will have a reasonably long life.

It will be still further understood by those skilled in the tool holder art that various modifications may be made in the embodiment 40 shown without departing from the spirit and scope of the invention.

What is claimed is:

1. A tool holder for supporting a tool, said tool holder being supported by the belt of a worker, comprising:

a predetermined length of a predetermined metal;

said length of metal having respective end portions and an intermediate portion;

each of said end portions formed into a generally inverted U-shaped member, said pair of U-shaped members being spaced apart and aligned, said U-shaped members adapted to being oriented generally horizontally and for receiving said belt through each of said U-shaped members whereby said tool holder is supported by said belt; and said intermediate portion extending substantially perpendicular to said end portions and formed into a generally convoluted configuration to provide a substantially circular-shaped member, said circular-shaped member lying in a plane substantially perpendicular to the respective planes in which said U-shaped members lie, said intermediate portion including first and second end sections spaced from the open ends of said respective U-shaped members so that said first and second end sections operate to retain said belt within said respective U-shaped members, and said generally circular-shaped member being disposed for receiving said tool whereby said tool holder supports said tool.

2. A tool holder according to claim 1 wherein said predetermined length of predetermined metal is a continuous length of predetermined metal having a length in the range of from 10 to 36 inches.

3. A tool holder according to claim 1 or 2 wherein said circular shaped member has a diameter in the range of from ½ inch to 2½ inches.

4. A tool holder according to claim 3 wherein said predetermined length of a predetermined metal has a thickness in the range of from ⅛ inch to ¼ inch.

5. A tool holder according to claim 1 or 2 wherein said predetermined length of a predetermined metal has a thickness in the range of from ⅛ inch to ¼ inch.

6. A tool holder according to claim 1 wherein said circular-shaped member includes a portion having a double loop which acts as a holder for receiving tools between said double loop.

* * * * *